(12) United States Patent
Hashimoto et al.

(10) Patent No.: US 9,819,240 B2
(45) Date of Patent: Nov. 14, 2017

(54) CENTRALIZED POWER DISTRIBUTION MEMBER FOR MOTOR WITH DETACHABLE AUXILIARY HOLDER

(71) Applicants: Sumitomo Wiring Systems, Ltd., Yokkaichi-shi, Mie (JP); Mitsubishi Heavy Industries, Ltd., Minato-ku, Tokyo (JP)

(72) Inventors: Tsutomu Hashimoto, Yokkaichi (JP); Satoshi Fukahori, Tokyo (JP)

(73) Assignees: Sumitomo Wiring Systems, Ltd. (JP); Mitsubishi Heavy Industries, Ltd. (JP)

( * ) Notice: Subject to any disclaimer, the term of this patent is extended or adjusted under 35 U.S.C. 154(b) by 124 days.

(21) Appl. No.: 14/767,437

(22) PCT Filed: Jan. 31, 2014

(86) PCT No.: PCT/JP2014/052232
§ 371 (c)(1),
(2) Date: Aug. 12, 2015

(87) PCT Pub. No.: WO2014/129288
PCT Pub. Date: Aug. 28, 2014

(65) Prior Publication Data
US 2015/0381002 A1    Dec. 31, 2015

(30) Foreign Application Priority Data
Feb. 22, 2013    (JP) .................................. 2013-033246

(51) Int. Cl.
*H02K 3/28* (2006.01)
*H02K 3/52* (2006.01)
*H02K 15/00* (2006.01)

(52) U.S. Cl.
CPC ............... *H02K 3/28* (2013.01); *H02K 3/522* (2013.01); *H02K 15/0056* (2013.01); *H02K 2203/09* (2013.01)

(58) Field of Classification Search
CPC .. H02K 3/28; H02K 3/52; H02K 3/521; H02K 3/522; H02K 2203/09;
(Continued)

(56) References Cited

U.S. PATENT DOCUMENTS

| 6,600,244 B2 | 7/2003 | Olazaki |
| 2002/0067094 A1 | 6/2002 | Olazaki |

(Continued)

FOREIGN PATENT DOCUMENTS

| JP | 2002-95199 | 3/2002 |
| JP | 2002-171708 | 6/2002 |

(Continued)

OTHER PUBLICATIONS

Japanese Office Action dated May 24, 2016.
(Continued)

*Primary Examiner* — Quyen Leung
*Assistant Examiner* — Minki Chang
(74) *Attorney, Agent, or Firm* — Gerald E. Hespos; Michael J. Porco; Matthew T. Hespos

(57) ABSTRACT

A centralized power distribution member A configured to feed power to windings of a stator S of a multi-phase motor includes a plurality of annular busbars 10 each including a power feeding terminal 20 and connection terminals 15 to be connected to one ends of the windings of each phase on one side edge, an annular holder 30 made of synthetic resin and configured to accommodate the busbars 10 laminated in a radial direction in a mutually insulated manner, neutral point busbars 50 configured to connect the other ends of the windings of each phase, and auxiliary holders 60, 60X made (Continued)

of synthetic resin and configured to accommodate the neutral point busbars 50. The auxiliary holders 60, 60X are arranged on one end surface side of the annular holder 30 where the power feeding terminals 20 and the connection terminals 15 are arranged.

7 Claims, 13 Drawing Sheets

(58) Field of Classification Search
CPC .......... H02K 15/0056; H02K 15/0062; H02K 15/10; H02K 15/12
USPC .................................. 310/71, 208, 201, 214
See application file for complete search history.

(56) References Cited

U.S. PATENT DOCUMENTS

| | | | | |
|---|---|---|---|---|
| 2003/0090166 | A1* | 5/2003 | Kobayashi | H02K 3/522 310/144 |
| 2003/0094879 | A1* | 5/2003 | Kobayashi | H02K 3/522 310/238 |
| 2003/0173842 | A1* | 9/2003 | Kobayashi | H02K 15/0056 310/71 |
| 2013/0113313 | A1* | 5/2013 | Ikura | H02K 3/522 310/71 |
| 2014/0175921 | A1* | 6/2014 | Tomita | H02K 3/50 310/71 |
| 2015/0008775 | A1* | 1/2015 | Arai | H02K 3/522 310/71 |

FOREIGN PATENT DOCUMENTS

| | | | | |
|---|---|---|---|---|
| JP | 2002171708 A | 6/2002 | | |
| JP | 2003-134759 | 5/2003 | | |
| JP | 2005-57932 | 3/2005 | | |
| JP | 2007-209100 | 8/2007 | | |
| JP | 2007-259642 | 10/2007 | | |
| JP | 2009-148026 | 7/2009 | | |
| JP | 2011-182511 | 9/2011 | | |
| JP | 2011182511 A | 9/2011 | | |
| JP | 2011-205877 | 10/2011 | | |
| JP | 2013-99154 | 5/2013 | | |
| WO | WO 2011151692 A2 * | 12/2011 | | H02K 3/522 |
| WO | WO 2013129377 A1 * | 9/2013 | | H02K 3/522 |

OTHER PUBLICATIONS

International Search Report.
Written Opinion and International Preliminary Report on Patentability.

* cited by examiner

CENTRALIZED POWER DISTRIBUTION MEMBER FOR MOTOR WITH DETACHABLE AUXILIARY HOLDER

BACKGROUND

1. Field of the Invention

The present invention relates to a centralized power distribution member for motor.

2. Description of the Related Art

An example of a centralized power distribution member for feeding power to windings of a stator of a three-phase motor is known from Japanese Unexamined Patent Publication No. 2003-134759. This is provided with three annular busbars each including one power feeding terminal to be connected to a power supply and a plurality of connection terminals to be connected to one ends of windings of respective U-, V- and W-phases on one side edge and having different radial dimensions and an annular holder made of resin in which as many accommodation grooves as the busbars are concentrically provided, and structured such that the respective busbars laminated in a radial direction in a mutually insulated manner are accommodated by being inserted into the corresponding accommodation grooves of the annular holder.

On the other hand, if a connection mode of a three-phase alternating current is a star connection, the other ends of the windings of each phase need to be connected by a neutral point. Conventionally, it has been proposed to separately provide neutral point busbars and concentrically assemble them with the three busbars in the above annular holder.

In the case of mounting the neutral point busbars into the annular holder, the windings of the aforementioned stator are generally arranged at an inner peripheral side of the annular holder and there are constraints in mounting. Thus, it is considered to mount the neutral point busbars on the outermost periphery of the annular holder. However, if the neutral point busbars are mounted on the outermost periphery of the annular holder, the annular holder is widened outwardly by that much and a radial dimension of a case for accommodating the annular holder also increases. Thus, such mounting cannot be dealt with in terms of space in some cases and a countermeasure therefor has been desired.

The present invention was completed based on the above situation and aims to realize space saving by suppressing the enlargement of an annular holder in a radial direction even if a neutral point busbar is mounted.

SUMMARY

The present invention is directed to a centralized power distribution member configured to feed power to windings of a stator of a multi-phase motor, including a plurality of annular busbars each including a power feeding terminal and a connection terminal to be connected to one end of the winding of each phase on one side edge, an annular holder made of synthetic resin and configured to accommodate the busbars laminated in a radial direction in a mutually insulated manner, a neutral point busbar configured to connect the other end of the winding of each phase, and an auxiliary holder made of synthetic resin and configured to accommodate the neutral point busbar, the auxiliary holder being arranged on one end surface side of the annular holder where the power feeding terminals and the connection terminals are arranged.

According to the above configuration, the auxiliary holder accommodating the neutral point busbar is structured to be arranged effectively utilizing a space on the one end surface side of the annular holder where the power feeding terminals and the connection terminals are arranged, i.e. a so-called dead space. Thus, space saving in a radial direction can be realized by suppressing the enlargement of the annular holder in the radial direction.

Further, the following configurations may be adopted.

The auxiliary holder is used also as a cover mounted on the annular holder to prevent the detachment of the busbars accommodated in the annular holder.

In this configuration, the number of components and the number of assembling steps can be reduced and a contribution to a reduction in production cost can be made.

The connection terminals provided on the respective busbars and connection terminals provided on the neutral point busbar and to be connected to the other ends of the windings are arranged on the same circumference.

In this configuration, a narrower and more compact structure is obtained.

According to the centralized power distribution member of the present invention, it is possible to realize space saving by suppressing the enlargement of an annular holder in a radial direction even if a neutral point busbar is mounted.

DETAILED DESCRIPTION

One embodiment of the present invention is described based on FIGS. 1 to 13.

A motor of this embodiment is a three-phase alternating current brushless motor with 12 pole pairs to be mounted in a hybrid vehicle and is arranged, for example, in a narrow space between an engine and a transmission and includes a rotor (not shown) coaxially coupled to a horizontal crankshaft of the engine, an annular stator S (see FIG. 7) concentrically surrounding the rotor and an annular centralized power distribution member A concentrically surrounding the stator S. The stator S is composed of a plurality of magnetic poles (not shown) formed by winding coils on cores, the magnetic poles are arranged at fixed intervals along a circumference concentric with the rotor, opposite end parts of a winding are drawn out from each magnetic pole and a star connection method is adopted.

Figure 1:
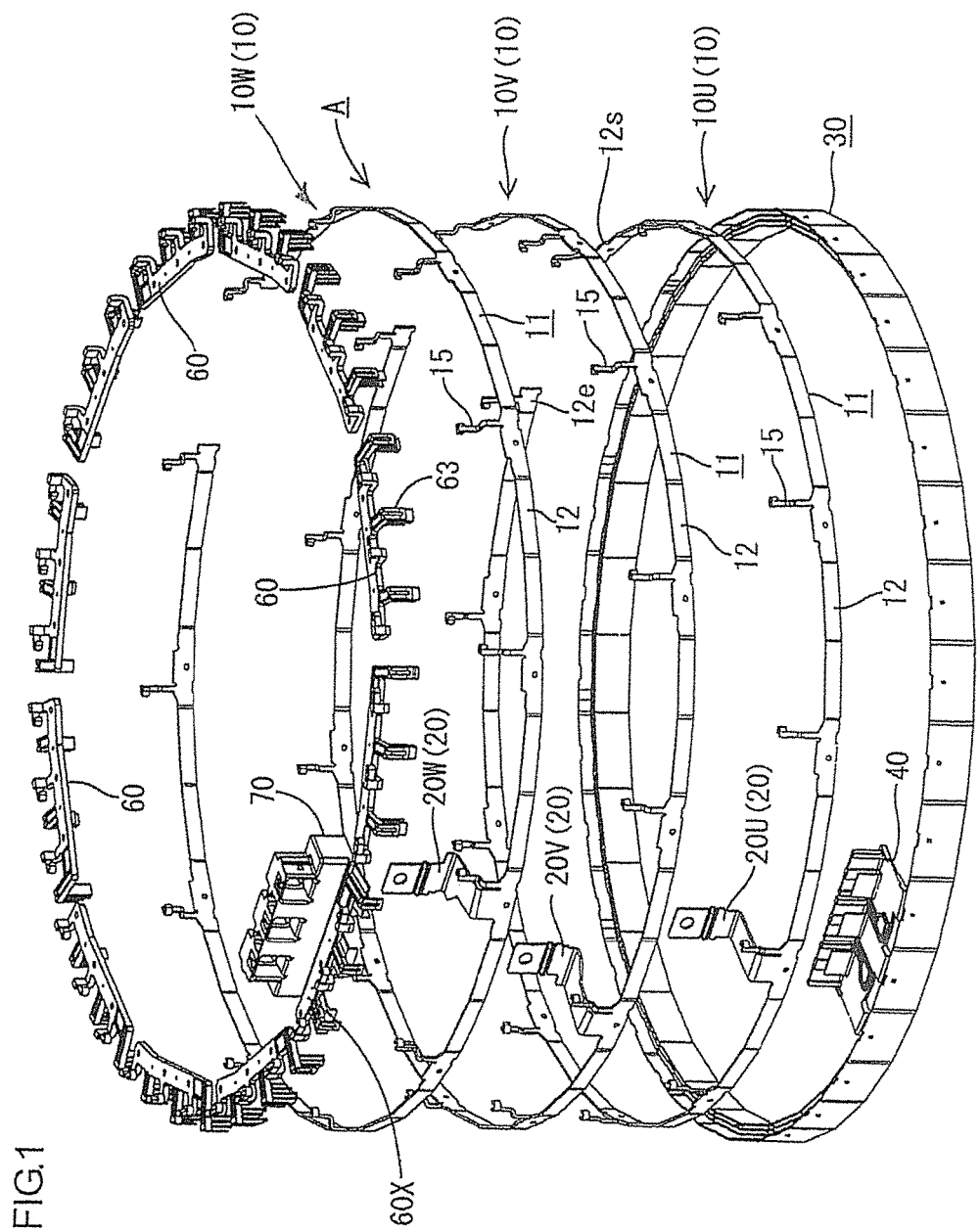
FIG. 1 is an exploded perspective view of a centralized power distribution member according to one embodiment of the present invention.

The centralized power distribution member A is for feeding power to the windings of the stator S and includes, as shown in FIG. 1, three annular busbars 10 and a holder 30 (corresponding to an "annular holder" of the invention) in which the busbars 10 are concentrically arranged while being insulated from each other.

Further, the centralized power distribution member A includes 12 separate neutral point busbars 50 annularly arranged as a whole (see FIG. 9), and each neutral point busbar 50 is embedded in an auxiliary holder 60, 60X by insert molding.

The busbar 10 is structured such that 12 connection terminals 15 and one power feeding terminal 20 are integrally formed to an annular busbar main body 11 having a regular polygonal shape with 36 sides, and three busbars 10 having different diameters are provided. Specifically, these busbars include a U-phase busbar 10U having a smallest diameter, a V-phase busbar 10V having a medium diameter and a W-phase busbar 10W having a largest diameter.

Note that, in the following description, the three busbars 10U, 10V and 10W are referred to as the busbars 10 as appropriate when being commonly described.

The busbar main body 11 of the busbar 10 is annularly formed into the regular polygonal shape with 36 sides as described above by bending a metal strip material at a predetermined angle in a plate thickness direction at every predetermined length. However, out of 36 sides of the regular polygonal shape, an area corresponding to slightly less than 3 sides on a final end side is cut off.

Figure 9:
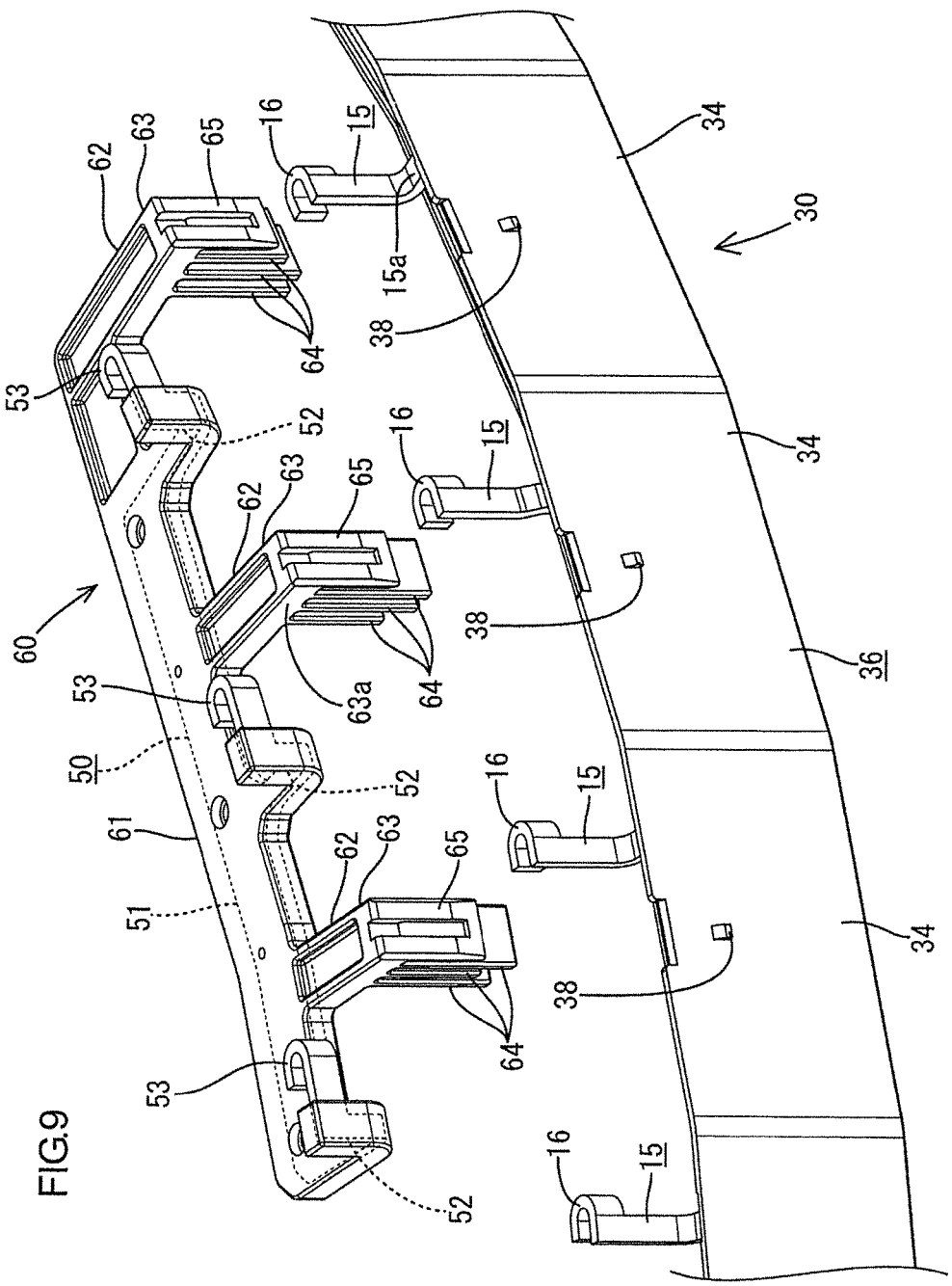
FIG. 9 is an exploded perspective view showing a mounting operation of the auxiliary holder.

As also shown in FIG. 9, the connection terminal 15 is formed into a crank shape by being bent at a right angle toward a center of the annular shape and standing upwardly again after standing upwardly from the upper edge of the busbar main body 11, and a U-shaped crimping portion 16 facing sideways is formed on the upper end. The connection terminal 15 is formed in the aforementioned posture at a total of 12 positions on every third edge part 12 including a starting edge part 12s and a short ending edge part 12e. Each crimping portion 16 functions to fix one end side of the corresponding winding by fusing.

Note that the larger the diameter of the busbar 10, the longer a horizontal portion 15a formed in an intermediate part of the connection terminal 15 in a height direction.

Figure 11:
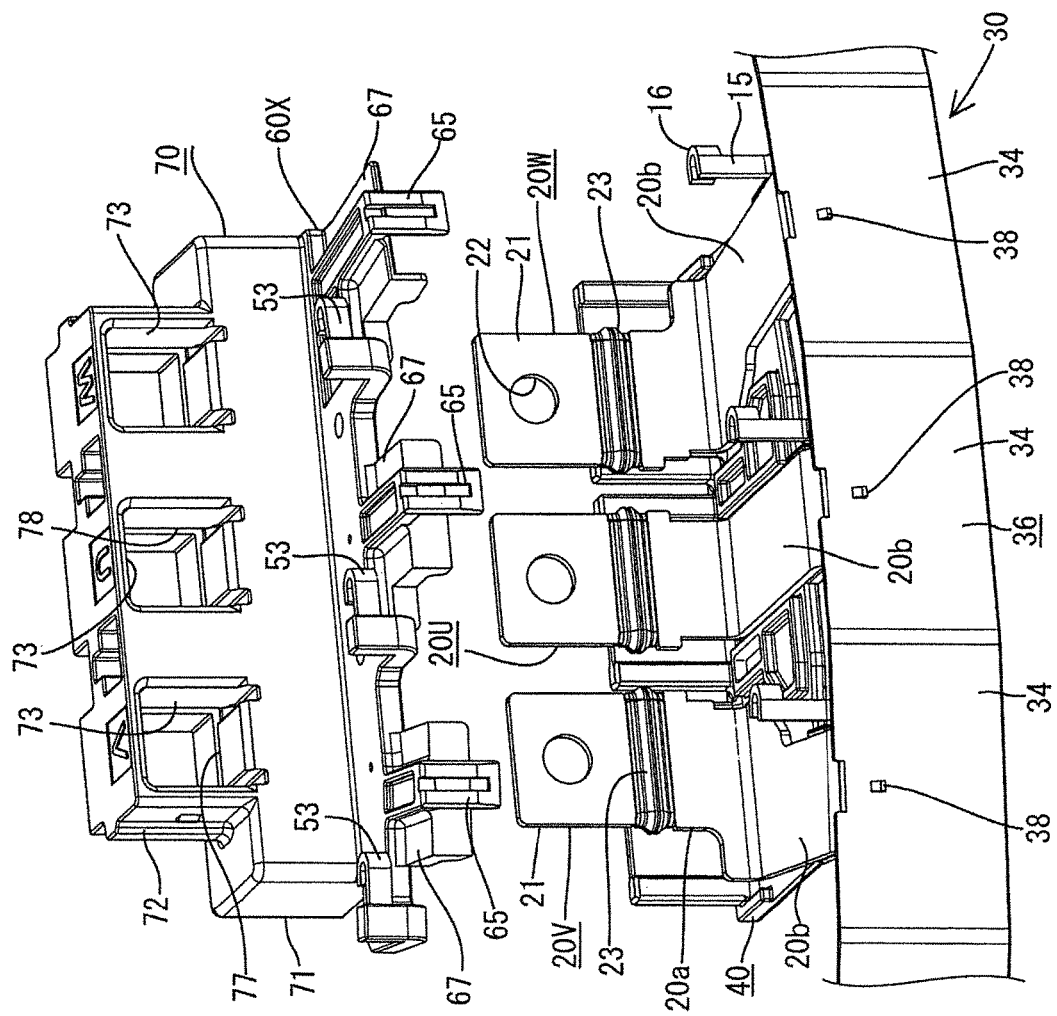
FIG. 11 is an exploded perspective view showing a mounting operation of an auxiliary holder with a nut holder.
Figure 12:
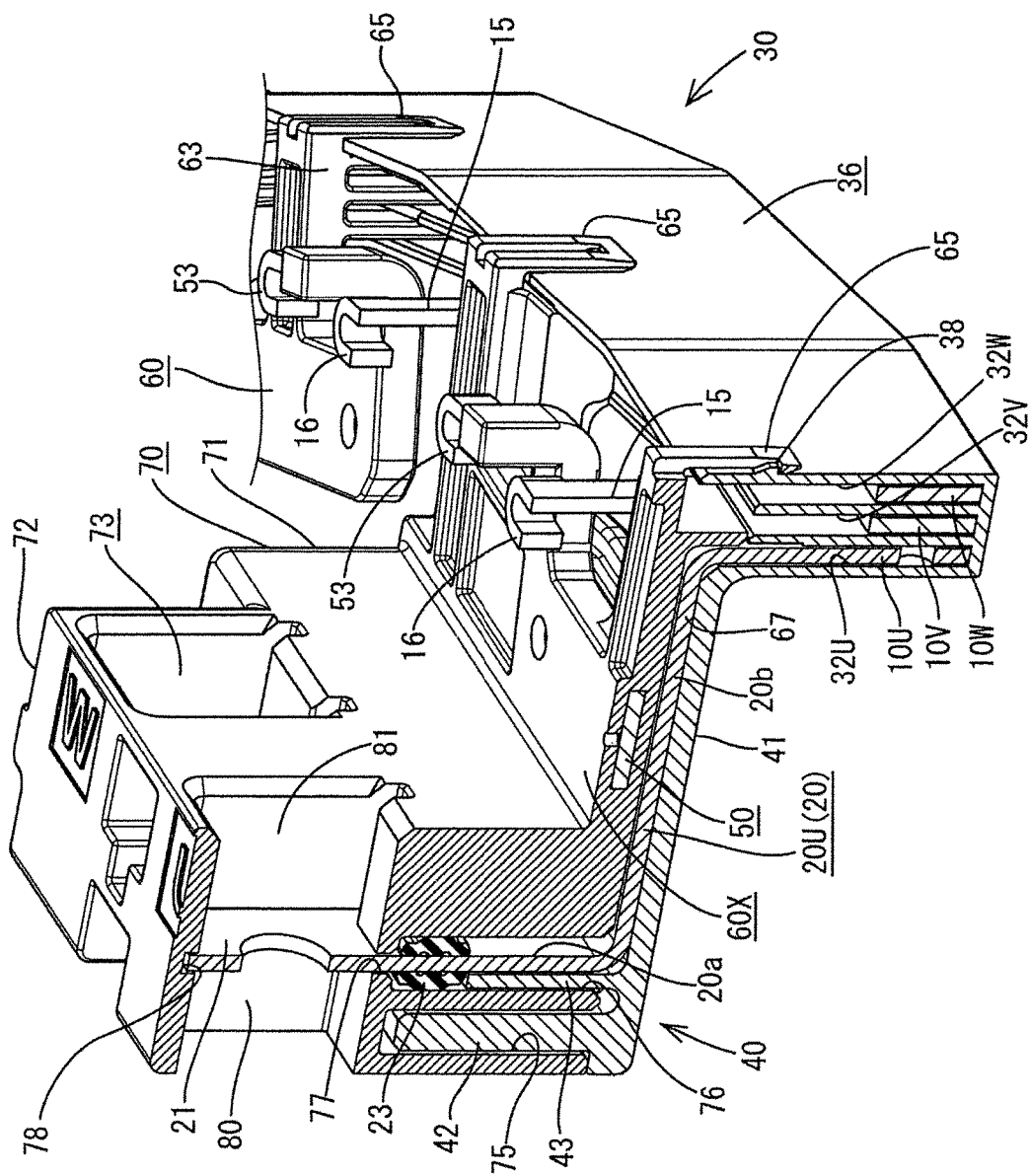
FIG. 12 is a perspective view in section when the mounting of the auxiliary holder with the nut holder is completed.

The power feeding terminal 20 is formed side by side with the connection terminal 15 on the edge part 12 where the sixth connection terminal 15 from the starting end out of the above connection terminals 15 is formed. The power feeding terminal 20 is formed by bending a wide strip material integrally formed on the upper edge of the busbar main body 11 and substantially formed into a crank shape by being bent at a right angle toward the center of the annular shape and standing upwardly again after standing upwardly a short distance from the upper edge of the busbar main body 11 as shown in FIGS. 11 and 12. An upper end part of an upper standing portion 20a of the power feeding terminal 20 serves as a connection plate 21 to be to connected to a mating power supply side terminal (not shown) and a bolt insertion hole 22 is open on this connection plate 21. Further, a rubber ring 23 is fitted with a downward movement regulated at a position of the standing portion 20a of the power feeding terminal 20 below the connection plate 21.

Note that the power feeding terminals 20 may be distinguished as the power feeding terminals 20U, 20V and 20W in correspondence with the busbars 10U, 10V 10W on which they are formed.

Figure 2:
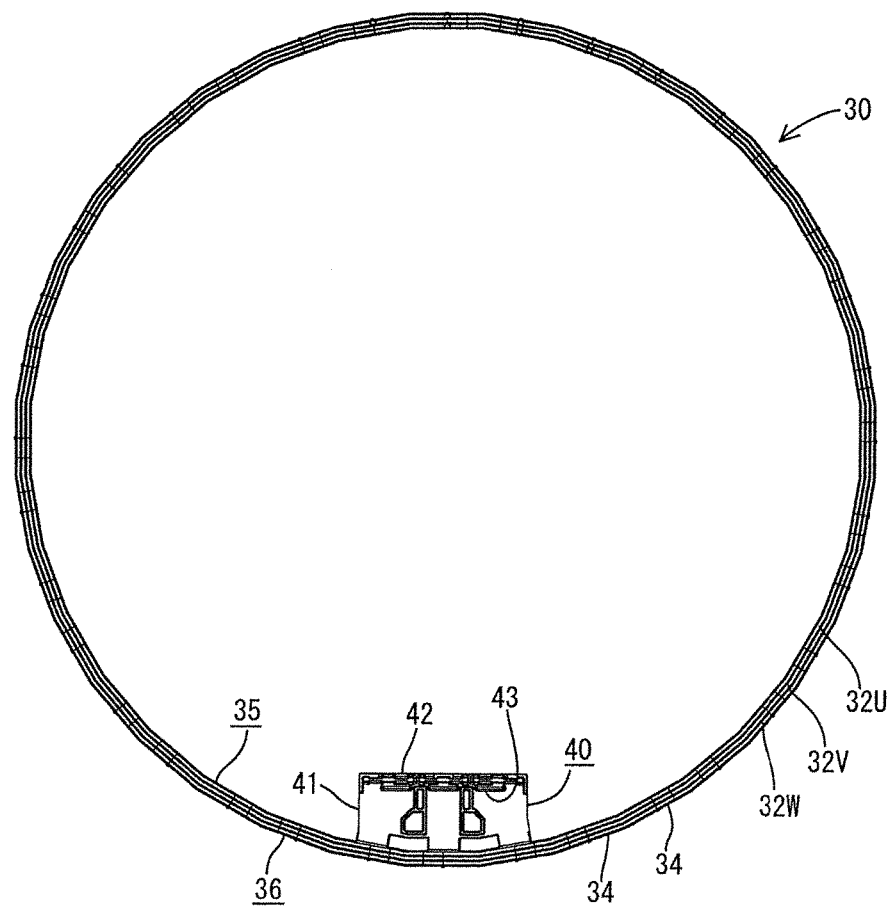
FIG. 2 is a plan view of a holder.
Figure 10:
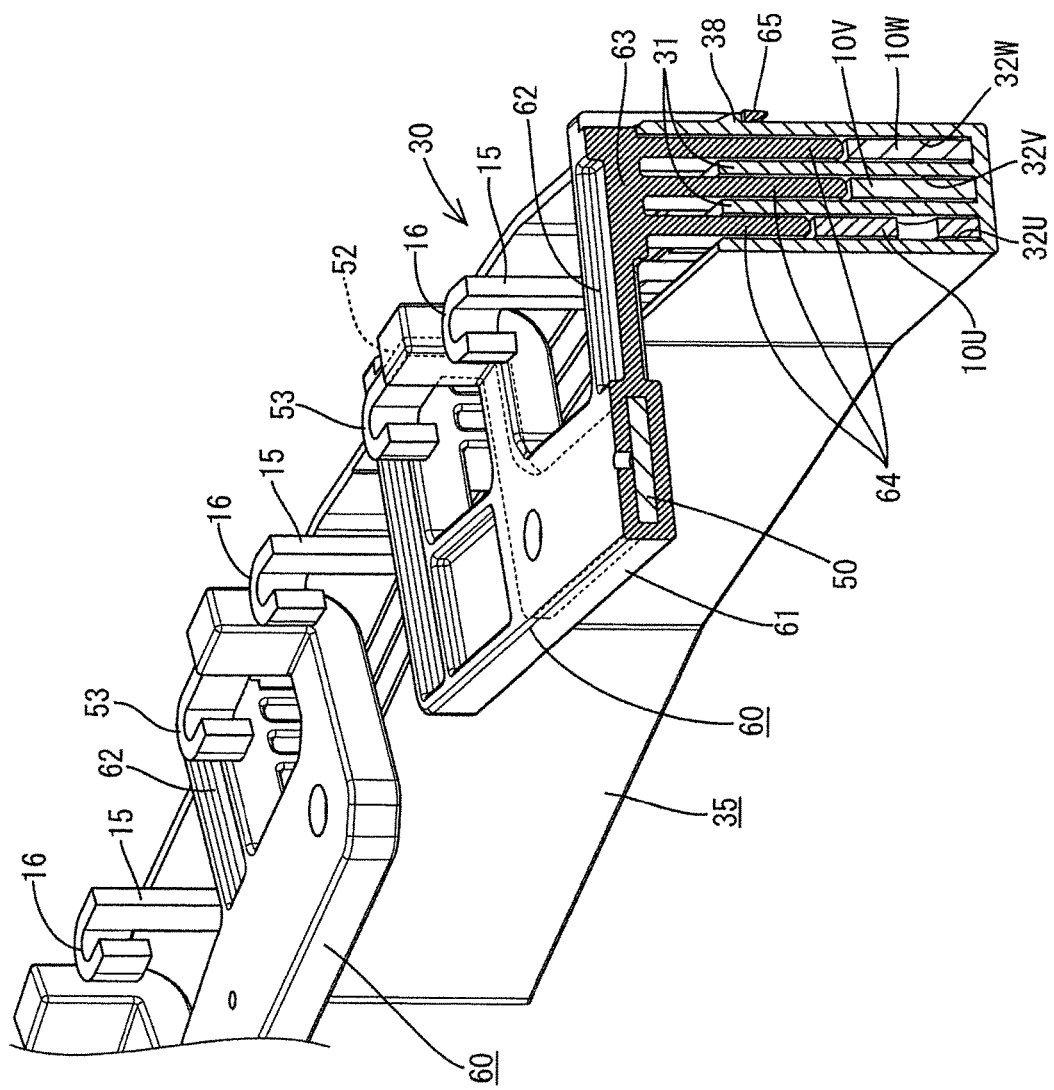
FIG. 10 is a perspective view in section when the mounting of the auxiliary holder is completed.

The holder 30 is made of synthetic resin which is an insulator, in the form of a groove having an upper surface opening and annularly formed into a regular polygonal shape with 36 sides similarly to the busbars 10 as shown in FIG. 2. As shown in FIG. 10, a depth of the holder 30 is about twice the width of the busbar main body 11. Two partition walls 31 having a polygonal shape with 36 sides are formed to stand up from the inner bottom surface of the holder 30 over the entire height while being radially spaced apart a predetermined distance, whereby three accommodation grooves 32 having a rectangular polygonal shape with 36 sides and having mutually different diameters are concentrically formed.

Out of the three accommodation grooves 32 of the holder 30, the U-phase busbar 10U having a smallest diameter is accommodated in the innermost accommodation groove 32U, the V-phase busbar 10V having a medium diameter is accommodated in the middle accommodation groove 32V and the W-phase busbar 10W having a largest diameter is accommodated in the outermost accommodation groove 32W.

When the three busbars 10U, 10V and 10W are accommodated in a predetermined rotational posture into the corresponding accommodation grooves 32U, 32V and 32W of the holder 30, the power feeding terminals 20 provided on the respective busbars 10 are horizontally juxtaposed to be arranged together at one position as shown in FIG. 11. When viewed from an outer peripheral side, the power feeding terminal 20U of the U-phase busbar 10U is located in the center, the power feeding terminal 20V of the V-phase busbar 10V is located on the left end and the power feeding terminal 20W of the W-phase busbar 10W is located on the right end. Particularly, the upper standing portions 20a of the respective power feeding terminals 20 are arranged in a straight line.

Figure 3:
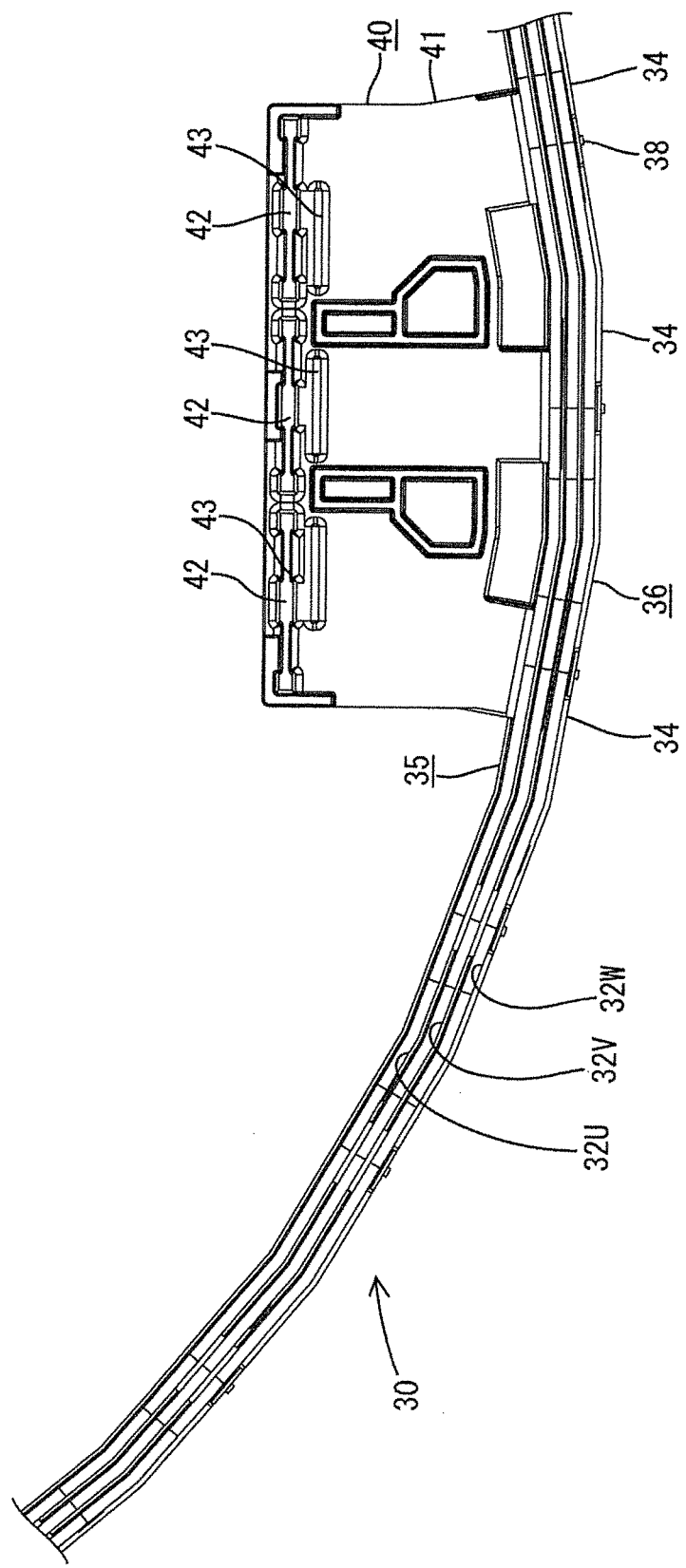
FIG. 3 is a partial enlarged view of FIG. 2.

In response to the arrangement of the above three power feeding terminals 20, the holder 30 is integrally formed with a common terminal block 40. As shown in FIGS. 3 and 11, the terminal block 40 is formed to bulge out toward the center of the annular shape from upper edge parts of inner walls 35 in an area extending over predetermined three consecutive edge parts 34 of the holder 30. The terminal block 40 is such that three supporting walls 42 are formed to stand upwardly while being spaced apart a short distance on a bulging edge of a receiving plate 41 for receiving horizontal portions 20b of the respective power feeding terminals 20 with the horizontal portions 20b insulated from each other. Short splint walls 43 are formed while being spaced apart at front sides of the respective supporting walls 42. As shown in FIG. 12, the inner surfaces of the standing portions 20a of the power feeding terminals 20 below the rubber rings 23 are held in contact with the front surfaces of these splint walls 43.

As described above, there are 12 divided neutral point busbars 50, which are identically shaped. As shown by broken line in FIGS. 8 and 9, each neutral point busbar 50 includes a main body portion 51 bent at an obtuse angle at an intermediate position of a strip material near one longitudinal end side (front end side in a clockwise direction in a plan view), L-shaped connection terminals 52 standing upwardly after projecting outwardly are formed on three positions of the outer edge of this main body portion 51, i.e. on a longitudinal central part and opposite end parts, and a U-shaped crimping portion 53 facing sideways is formed on the standing end of each connection terminal 52. This crimping portion 53 functions to fix the other end part of the corresponding winding by fusing.

Each of the 12 neutral point busbars 50 is embedded in the auxiliary holder 60, 60X by insert molding. 11 out of the 12 auxiliary holders 60 are identically shaped and the remaining one auxiliary holder 60X differs from the other 11 auxiliary holders 60 in that the shape thereof is slightly changed and, in addition, a nut holder 70 as a power feeding unit is integrally formed.

As shown in FIG. 9, the auxiliary holder 60 is formed to embed the neutral point busbar 50 in a state where only the respective crimping portions 53 of the three connection terminals 52 in the neutral point busbar 50 are exposed and includes a strip-like main body portion 61 bent at an obtuse angle at a position near one longitudinal end side (front end side in a clockwise direction in a plan view) and having a flat cross-sectional shape. A rear end side of this strip-like main body portion 61 in the clockwise direction extends a predetermined distance from the rear end position of the main body portion 51 of the embedded neutral point busbar 50 and has a length comparable to a length of three consecutive edge parts 34 of the holder 30 as a whole.

On the outer side edge of the strip-like main body portion 61, arm portions 62 are formed to project outwardly at positions spaced apart backwardly a predetermined distance in the clockwise direction from the exposed positions of the three crimping portions 53 and a cover portion 63 for covering the aforementioned upper surface opening of the holder 30 is formed on a projecting end side of each arm portion 62. Specifically, the cover portion 63 is provided with three pressing pieces 64 which hang down while being spaced apart from each other and are respectively inserted into the corresponding accommodation grooves 32 to press the upper edges of the busbars 10 accommodated in the accommodation grooves 32.

A frame-like, resiliently displaceable and downward extending locking piece 65 is formed outwardly of the cover portion 63 of the arm portion 62. On the other hand, locking protrusions 38 to be fitted into the above locking pieces 65 for locking are formed on outer walls 36 of predetermined three consecutive edge parts 34 of the holder 30.

Accordingly, the auxiliary holder 60 is retained and mounted by fitting and locking the locking pieces 65 to the locking protrusions 38 as shown in FIG. 10 when three cover portions 63 are inserted into the upper surface opening of the holder 30 at the corresponding predetermined edge parts 34, i.e. the respective pressing pieces 64 are inserted into the corresponding accommodation grooves 32 and, on the other hand, the locking pieces 65 are pushed while moving onto the locking protrusions 38 along the outer walls 36 of the corresponding edge parts 34 and upper surface parts 63a of the cover portions 63 close the upper surface opening of the holder 30.

With the auxiliary holder 60 mounted, each pressing piece 64 of the cover portion 63 presses and retains the corresponding busbar 10 as shown in FIG. 10. Associated with that, the crimping portions 53 of the three connection terminals 52 of the neutral point busbar 50 and the crimping portions 16 of the connection terminals 15 of the busbars 10 are alternately arranged one by one. More specifically, the crimping portions 16, 53 of the respective connection terminals 15, 52 are located at the same height position having a predetermined height from the upper surface of the holder 30 and located on a concentric circle one size smaller than the inner walls 35 of the holder 30 at an inner peripheral side of the holder 30.

The remaining one auxiliary holder 60X is similar in shape to the auxiliary holder 60, also in that locking pieces 65 are provided, except that pressing plates 67 for pressing the horizontal portions 20b of the power feeding terminals 20 are provided on lower surface sides of arm portions 62 instead of the cover portions 63 of the aforementioned auxiliary holder 60.

Figure 8:
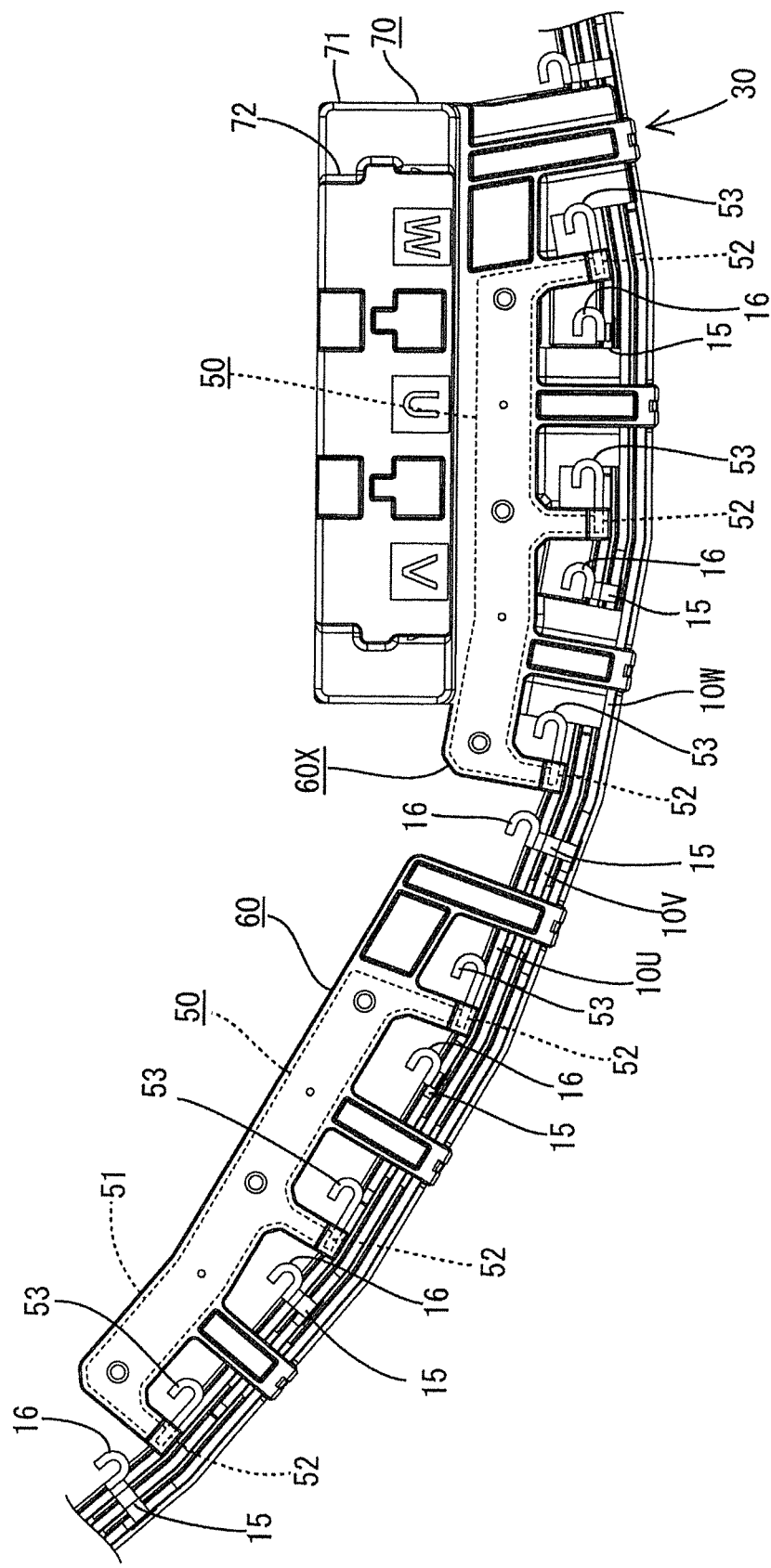
FIG. 8 is a partial enlarged view of FIG. 7.

However, the nut holder 70 is integrally formed on an inner peripheral edge side of this auxiliary holder 60X. As shown in FIGS. 8 and 11, this nut holder 70 is in the form of such a laterally long and stepped block that a slightly narrow connecting portion 72 is arranged in a central part of the upper surface of a base portion 71 having a width substantially equal to the entire length of the auxiliary holder 60X.

Three mounting holes 73 penetrating in an in-out direction and having a rectangular cross-section are open on the connecting portion 72 of the nut holder 70 at the same intervals as the connection plates 21 of the three power feeding terminals 20U, 20V and 20W.

As shown in FIG. 12, a mounting groove 75 which is open on the lower surface of the base portion 71 and into which the supporting walls 42 of the aforementioned terminal block 40 are inserted is formed in an area on an inner surface side of the base portion 71. Further, insertion grooves 76 into which the standing portions 20a of the respective power feeding terminals 20 are individually insertable and which have an open lower surface are formed substantially in a central part of the base portion 71 in a depth direction.

Specifically, a lower end part of the standing portion 20a of the power feeding terminal 20 is inserted together with the split wall 43 into a lower side of this insertion groove 76 and the fitted rubber ring 23 can be tightly press-fitted into an upper side thereof. A narrow passage groove 77 into which the connection plate 21 of the power feeding terminal 20 is inserted is formed on the ceiling surface of the insertion groove 76 and open on the bottom surface of the aforementioned mounting hole 73 substantially in a central part in the depth direction. Note that fitting grooves 78 into which left, right and upper edges of the connection plate 21 of the power feeding terminal 20 are fitted are formed to communicate with the passage groove 77 on the left and right side surfaces and the ceiling surface of the mounting hole 73.

The mounting hole 73 is divided into inner and outer chambers by the inserted connection plate 21 of the power feeding terminal 20, wherein the inner chamber serves as a nut accommodating chamber 80 and, for example, a rectangular nut (not shown) is accommodated in a rotation stopped state. The nut is covered by an unillustrated back cover so as not to be detached.

On the other hand, the outer chamber serves as a terminal insertion chamber 81 into which a connection plate of the mating power supply side terminal is insertable.

Next, an example of an assembling procedure of the centralized power distribution member A according to this embodiment is described.

The holder 30 is placed in a horizontal posture, for example, on an assembling table as shown in FIG. 2. In this state, the three busbars 10U, 10V and 10W assuming a predetermined rotational posture are successively inserted into the corresponding accommodation grooves 32U, 32V and 32W from the inner one.

Figure 4:
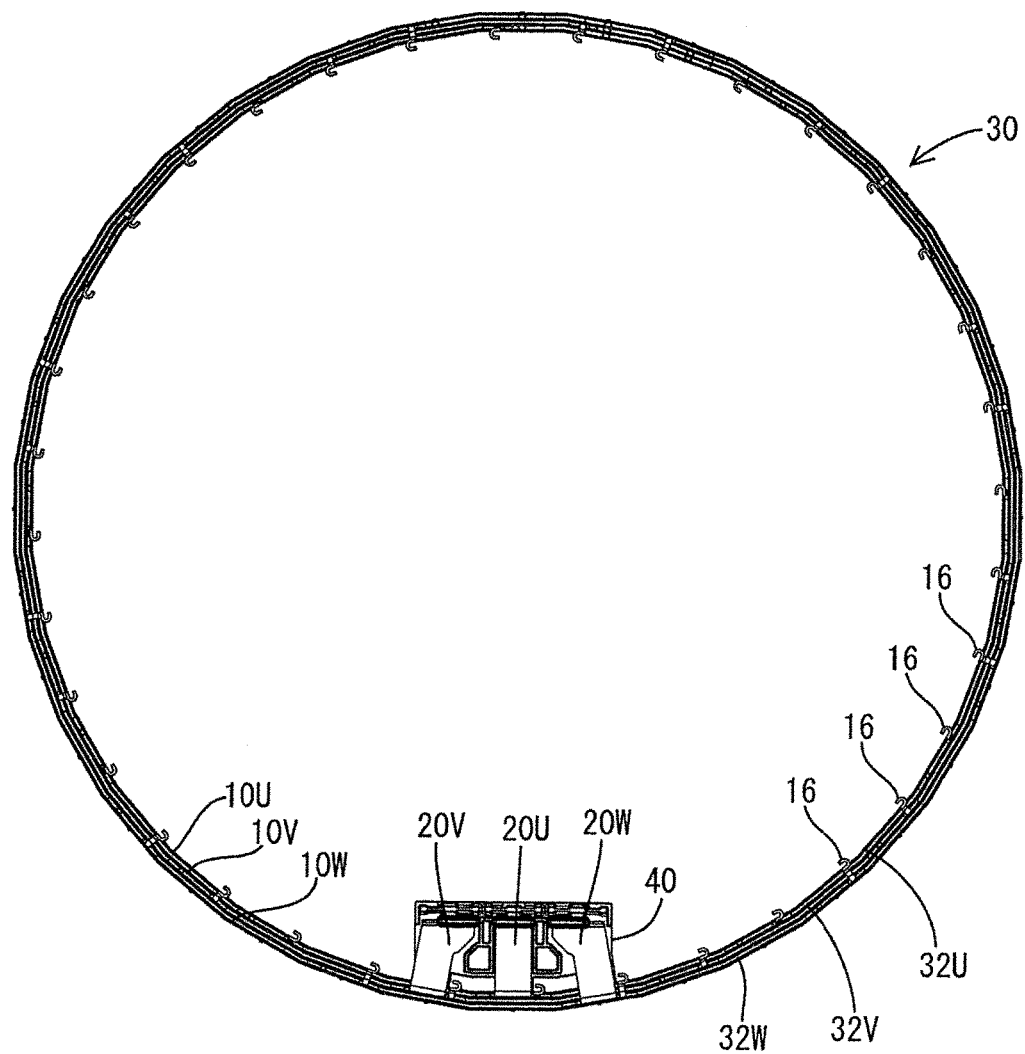
FIG. 4 is a plan view showing a state where busbars are accommodated in the holder.
Figure 5:
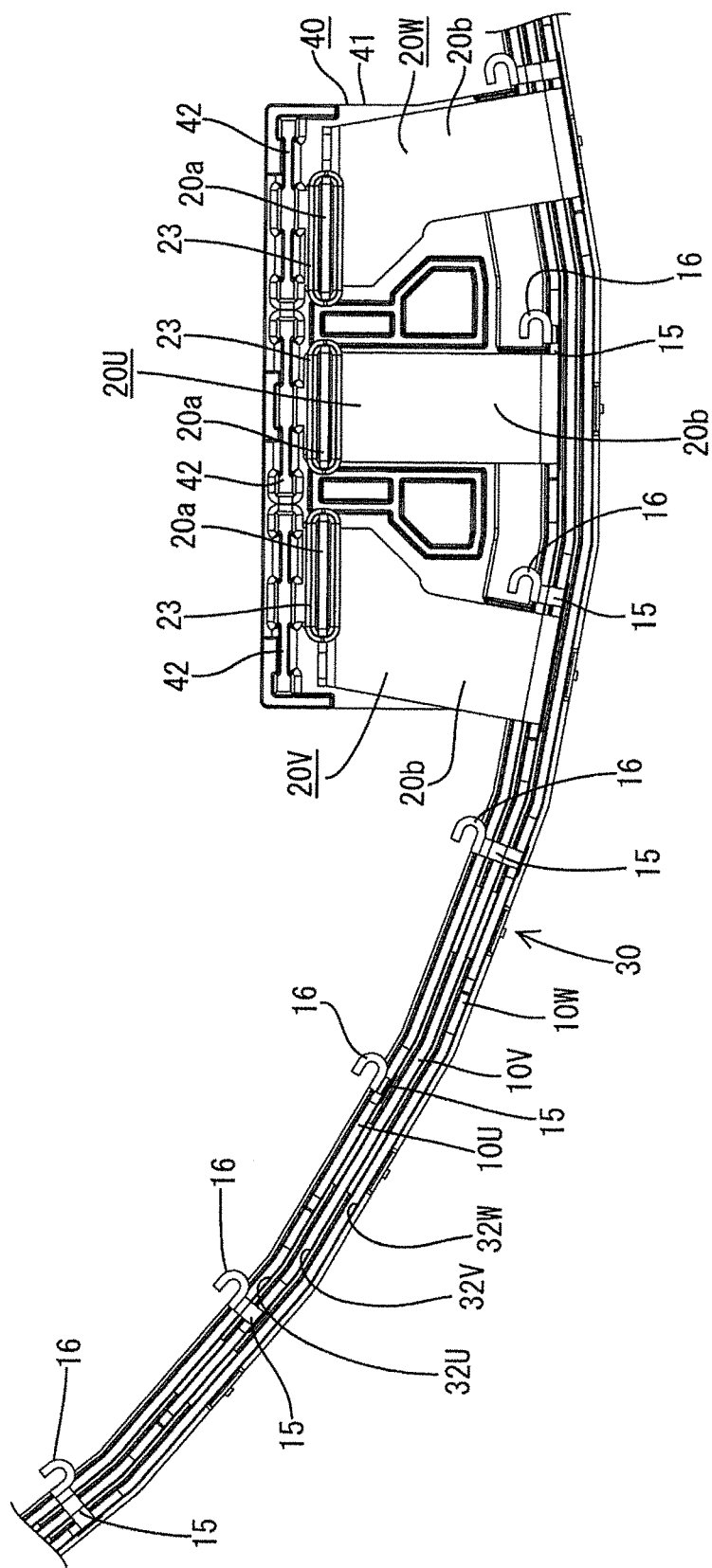
FIG. 5 is a partial enlarged view of FIG. 4.
Figure 6:
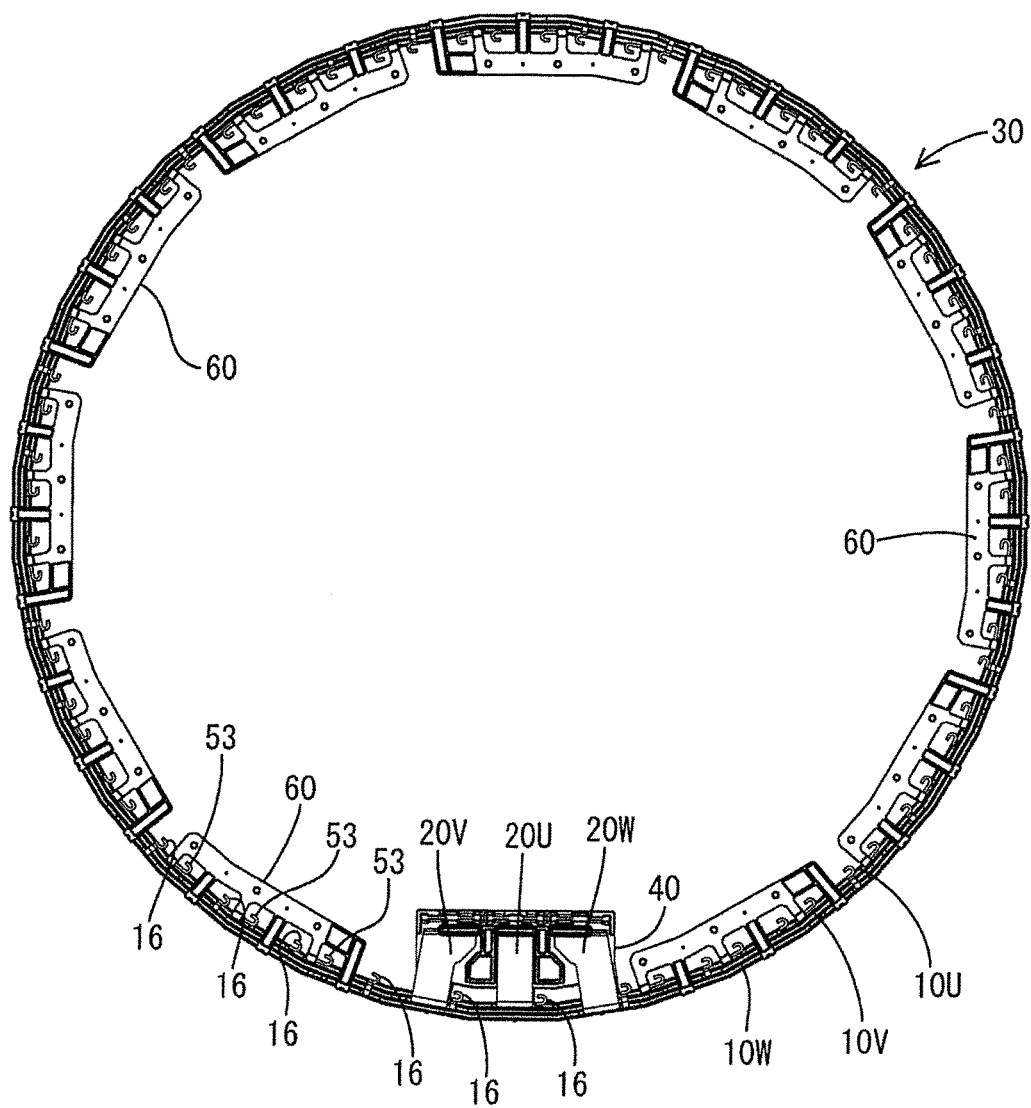
FIG. 6 is a plan view showing a state where 11 auxiliary holders are mounted in the holder.

When the mounting of the three busbars 10 is completed, 12 connection terminals 15 of each of the busbars 10U, 10V and 10W are annularly arranged at every third position as shown in FIGS. 4 and 5, in other words, 12 arcuate sets of the connection terminals 15 in each of which three U-, V- and W-connection terminals 15 are successively arranged are connected and annularly arranged. Here, the crimping portions 16 of all the connection terminals 15 are arranged on the concentric circle one size smaller than the inner walls 35 at positions at a predetermined distance above the upper surface of the holder 30 and projecting inwardly of the inner walls 35 of the holder 30.

Associated with that, the power feeding terminals 20U, 20V and 20W of the three busbars 10U, 10V and 10W are so supported side by side on the terminal block 40 formed to bulge out from the upper edge parts of the predetermined inner walls 35 of the holder 30 that the horizontal portions 20b are received by the receiving plate 41 while the lower end parts of the standing portions 20a are placed in contact with the split walls 43.

Subsequently, the auxiliary holders 60, 60X in which the neutral point busbars 50 are embedded are mounted. First, the 11 auxiliary holders 60 having a common structure are respectively mounted in 11 areas of the holder 30 where the set of the U-, V- and W-connection terminals 15 are arranged as shown in FIG. 9. The respective pressing pieces 64 of the three cover portions 63 are pushed while being inserted into the corresponding accommodation grooves 32 and the locking pieces 65 are resiliently fitted and locked to the locking protrusions 38 in the aforementioned manner, whereby the auxiliary holder 60 is mounted such that the cover portions 63 close the upper surface opening of the holder 30 while pressing the busbars 10 (FIG. 10).

The crimping portions 53 of the three connection terminals 52 of the neutral point busbar 50 are alternately arranged side by side with the crimping portions 16 of the set of the three connection terminals 15 on the side of the busbars 10 at every other position on the same circle.

Finally, the auxiliary holder 60X integrally formed with the nut holder 70 is mounted in an area provided with the terminal block 40 in the holder 30 as shown in FIG. 11.

Specifically, the connection plates 21 of the three juxtaposed power feeding terminals 20U, 20V and 20W are inserted and pushed into the corresponding insertion grooves 76 formed on the lower surface of the base portion 71 of the nut holder 70, the supporting walls 42 start being inserted into the mounting groove 75 on the lower surface of the nut holder 70 halfway through, the rubber rings 23 fitted on the standing portions 20a of the power feeding terminals 20 are press-fitted into the insertion grooves 76 and, then, parts of the standing portions 20a below the rubber rings 23 are inserted together with the split walls 43. During this time, the upper ends of the connection plates 21 enter the corresponding mounting holes 73 from the passage grooves 77.

When the lower surface of the base portion 71 of the nut holder 70 comes into contact with the receiving plate 41 of the terminal block 40, the pushing is stopped, the connection plates 21 of the respective power feeding terminals 20 enter the mounting holes 73 to partition the interiors into the inner and outer chambers and the upper edges and the side edges of the connection plates 21 are fitted and fixed in the fitting grooves 78 as shown in FIG. 12. Further, each rubber ring 23 is fitted into an upper end part of the insertion groove 76 while being resiliently compressed, thereby providing sealing in the passage groove 77.

On the other hand, on the side of the auxiliary holder 60X, the pressing plates 67 press the horizontal portions 20b of the corresponding power feeding terminals 20 and the locking pieces 65 are resiliently fitted and locked to the locking protrusions 38 in such a state, whereby the auxiliary holder 60X is mounted.

The crimping portions 53 of the three connection terminals 52 of the neutral point busbar 50 embedded in this auxiliary holder 60X are also alternately arranged side by side with the crimping portions 16 of the set of three connection terminals 15 on the side of the busbars 10 at every other position on the same circle.

Figure 7:
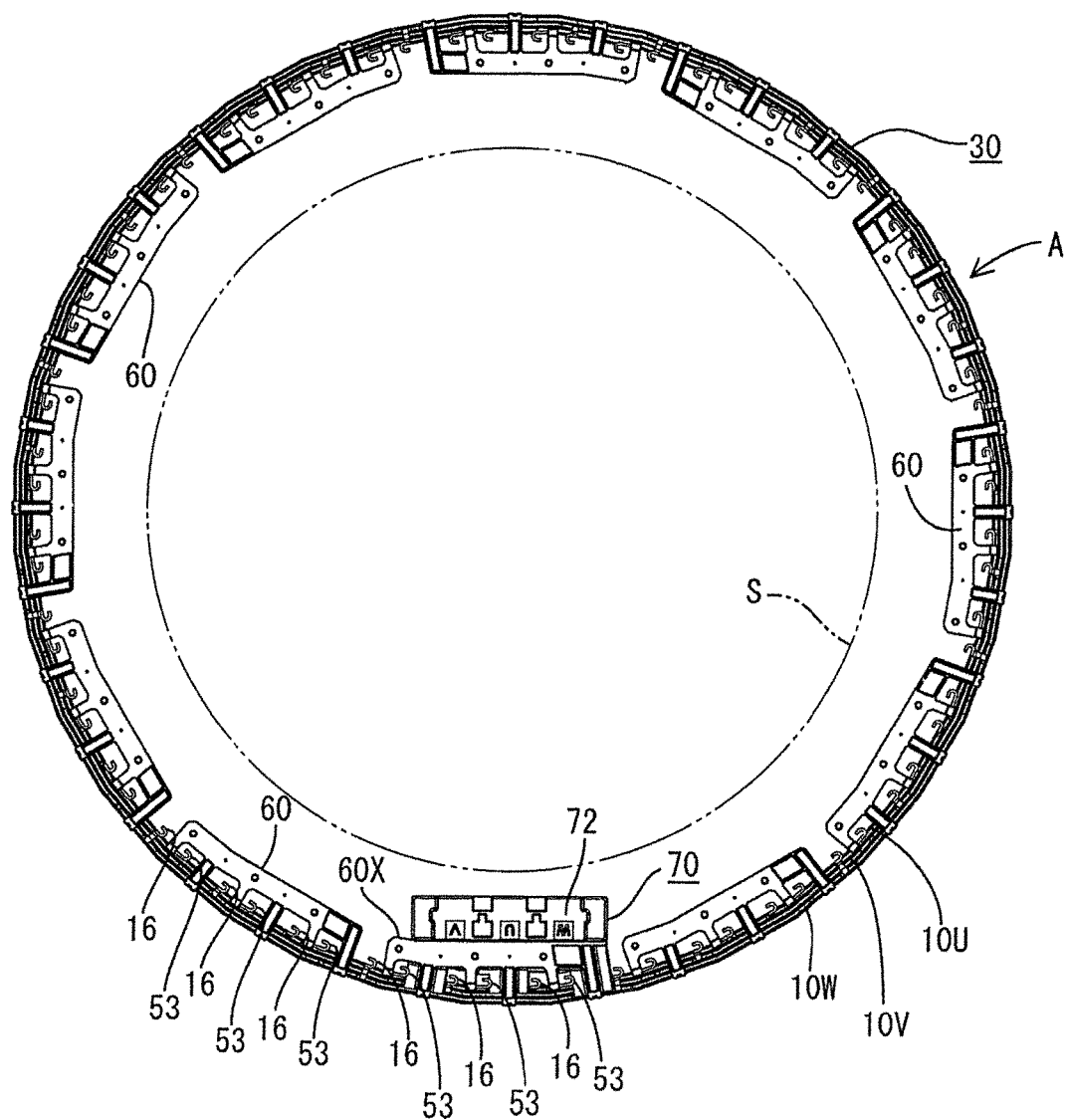
FIG. 7 is a plan view when the assembling of the centralized power distribution member is completed.
Figure 13:
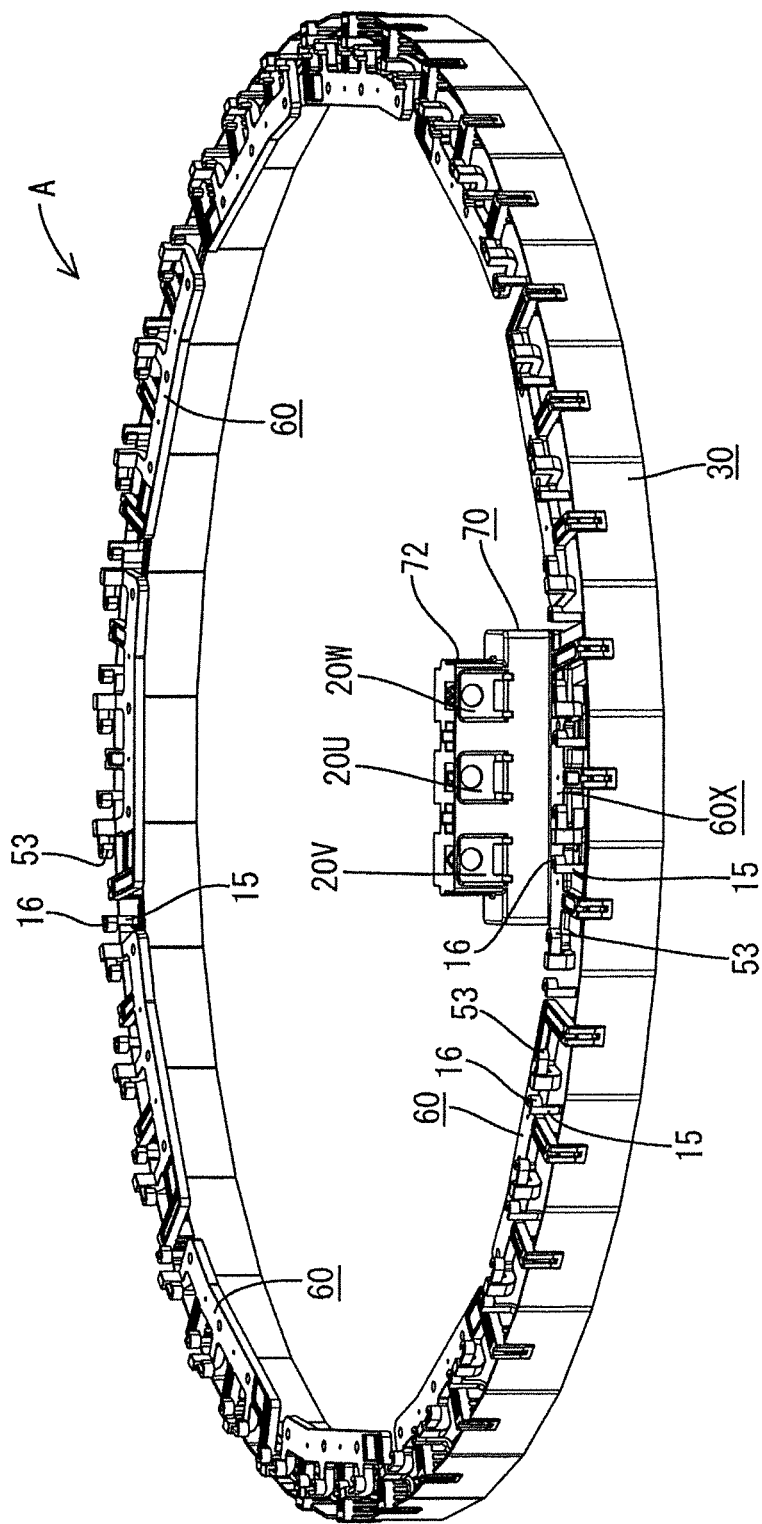
FIG. 13 is a perspective view when the assembling of the centralized power distribution member is completed.

The assembling of the centralized power distribution member A is completed in the above manner and formed as shown in FIGS. 7 and 13.

The centralized power distribution member A assembled as described above is fitted on an outer peripheral side of the stator S in the brushless motor as shown in FIG. 7, in other words, all the connection terminals 15 (crimping portions 16) of the three busbars 10 and all the connection terminals 52 (crimping portions 53) of the 12 neutral point busbars 50 are annularly arranged at an inner peripheral side of the inner walls 35 of the holder 30 and arranged on the upper surface of an outer peripheral part of the stator S.

In this state, one end parts of three juxtaposed windings out of the windings provided on the stator S are individually connected to the crimping portions 16 of the set of the U-, V- and W-connection terminals 15 by fusing and the other end parts of these three windings are similarly individually connected to the crimping portions 53 of the connection terminals 52 of the corresponding neutral point busbar 50 by fusing, whereby a star connection is completed.

Such a connection of the windings and the connection terminals 15, 52 is performed over the entire circumference, whereby 12 star connections are formed side by side.

Thereafter, for example, the centralized power distribution member A and the stator S are embedded in an annular molded article with only the connecting portion 72 of the nut holder 70 exposed outside.

At this time, in each mounting hole 73 of the nut holder 70, the connecting plate 21 of the power feeding terminal 20 is inserted through the passage groove 77 open on the bottom surface of the mounting hole 73 and there is a possibility that a clearance is unintentionally formed at an inner peripheral side of the passage groove 77 and leakage occurs inside and outside the molded article.

However, since the rubber ring 23 fitted on the standing portion 20a of the power feeding terminal 20 is pressed into contact with the peripheral surface of the insertion groove 76 at a position right below the passage groove 77, this clearance part is sealed.

To connect the centralized power distribution member A to a power supply side, the nuts are respectively accommodated in a rotation stopped state in the nut accommodation chambers 80 in the respective mounting holes 73 of the nut holder 70 and the back cover is mounted to prevent the detachment of the nuts. Then, the connection terminal (with a bolt insertion hole) of the mating power supply side terminal is inserted into the terminal insertion chamber 81, overlapped with the connection plate 21 of the power feeding terminal 20, and an unillustrated bolt is successively inserted through the bolt insertion hole of the connection plate of the power supply side terminal and the bolt insertion hole 22 of the connection plate 21 of the power feeding terminal 20, threadably engaged with a screw hole of the nut mounted in a rotation stopped manner on the back side and screwed into the nut by a tool, whereby the connection plate 21 of the power feeding terminal 20 and the connection plate of the mating power supply side terminal are fastened to establish an electrical connection.

As described above, according to the centralized power distribution member A of this embodiment, an arrangement structure of the neutral point busbar 50 is such that, after the neutral point busbar 50 is accommodated into the auxiliary holder 60, 60X, this auxiliary holder 60, 60X is arranged effectively utilizing a space on the upper surface side of the holder 30 and the stator S fitted inside the holder 30, i.e. a so-called dead space. Thus, space saving in a radial direction can be realized by suppressing the enlargement of the holder 30 in the radial direction.

Since the auxiliary holder 60 is integrally provided with the cover portions 63 for preventing the detachment of the busbars 10 accommodated in the holder 30, the number of components and the number of assembling steps can be reduced and a contribution to a reduction in production cost can be made as compared with the case where a cover is provided separately from the auxiliary holder 60.

Since the connection terminals 15 of the busbars 10 connected to the one ends of the windings and the connection terminals 52 of the neutral point busbars 50 connected to the other ends of the windings are arranged on the same circumference, a narrower and more compact structure can be obtained.

The present invention is not limited to the above described and illustrated embodiment. For example, the following embodiments are also included in the technical scope of the present invention.

The numbers of the neutral point busbars and the auxiliary holders are not limited to 12 as illustrated in the above embodiment and an arbitrary number may be adopted. Further, the neutral point busbars and the auxiliary holders may be integrally formed into an annular shape.

Depending on the shape and the like of the auxiliary holder, the auxiliary holder can also be accommodated and mounted within an area on the upper end surface of the holder and such an embodiment is also included in the technical scope of the present invention.

Although the cover portions are integrally formed to the auxiliary holder in the above embodiment, the auxiliary holder and a cover may be separately formed.

The connection terminals provided on the busbars and those provided on the neutral point busbars may not necessarily be arranged on the same circumference and such an embodiment is also included in the technical scope of the present invention.

Although 12 pole pairs of the three-phase alternating current are illustrated in the above embodiment, the number of pole pairs is arbitrary. Further, the phases of a multi-phase alternating current are not limited to three phases and may be two, four or more phases.

LIST OF REFERENCE SIGNS

A . . . centralized power distribution member
S . . . stator
10, 10U, 10V, 10W . . . busbar
15 . . . connection terminal
16 . . . crimping portion
20, 20U, 20V, 20W . . . power feeding terminal
30 . . . holder (annular holder)
32, 32U, 32V, 32W . . . accommodation groove
50 . . . neutral point busbar
52 . . . connection terminal
53 . . . crimping portion
60, 60X . . . auxiliary holder
63 . . . cover portion (cover)

The invention claimed is:

1. A centralized power distribution member for motor configured to feed power to windings of a stator of a multi-phase motor, comprising:
a plurality of annular busbars each including a power feeding terminal and a connection terminal to be connected to one end of the winding of each phase, the power feeding terminals and the connection terminals being on one axial end edge of the respective annular busbar;
an annular holder made of synthetic resin and configured to accommodate the busbars laminated in a radial direction in a mutually insulated manner;
a neutral point busbar configured to connect the other end of the winding of each phase; and
an auxiliary holder made of synthetic resin and configured to accommodate the neutral point busbar,
the auxiliary holder being arranged in an area of an end surface of the annular holder where the power feeding terminals and the connection terminals are arranged and being retracted radially inwardly of the outer periphery of the end surface, resiliently displaceable locking pieces formed on the auxiliary holder and being fit to locking protrusions formed on the annular holder to retain the auxiliary holder on the annular holder.

2. The centralized power distribution member for motor of claim 1, wherein the auxiliary holder covers an opening on the end surface of the annular holder to prevent detachment of the busbars accommodated in the annular holder.

3. The centralized power distribution member for motor of claim 2, wherein the connection terminals provided on the respective busbars and connection terminals provided on the neutral point busbar and to be connected to the other ends of the windings are arranged on the same circumference.

4. The centralized power distribution member for motor of claim 1, wherein the connection terminals provided on the respective busbars and connection terminals provided on the neutral point busbar and to be connected to the other ends of the windings are arranged on the same circumference.

5. The centralized power distribution member for motor of claim 1, wherein the annular holder has an outer circumferential surface formed with a plurality of locking protrusions, and wherein the auxiliary holder has a plurality of locking pieces releasably locked to the locking protrusions of the holder for detachably holding the auxiliary holder on the annular holder.

6. The centralized power distribution member for motor of claim 1, wherein the auxiliary holder is a first auxiliary holder, and wherein the centralized power distribution member has a plurality of additional auxiliary holders, each of the auxiliary holders extending through an arc that covers a selected circumferential portion of the annular holder.

7. The centralized power distribution member for motor of claim 6, wherein the auxiliary holders are arranged around the circumference of the annular holder.

* * * * *